US008127281B2

(12) United States Patent
Tal

(10) Patent No.: US 8,127,281 B2
(45) Date of Patent: Feb. 28, 2012

(54) METHOD AND APPARATUS FOR EFFICIENT MULTIPLE-PATTERN BASED MATCHING AND TRANSFORMATION OF INTERMEDIATE LANGUAGE EXPRESSION TREES

(75) Inventor: Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 11/955,120

(22) Filed: Dec. 12, 2007

(65) Prior Publication Data

US 2009/0157721 A1    Jun. 18, 2009

(51) Int. Cl.
G06F 9/45 (2006.01)
(52) U.S. Cl. .................. 717/144; 717/146; 717/151
(58) Field of Classification Search .......... 717/140–147, 717/151–157
See application file for complete search history.

(56) References Cited

U.S. PATENT DOCUMENTS

| 2006/0048012 A1 | 3/2006 | Barton et al. | 714/38 |
| 2006/0048121 A1 | 3/2006 | Blainey et al. | 717/160 |
| 2006/0048122 A1 | 3/2006 | Barton et al. | 717/160 |
| 2006/0206876 A1 | 9/2006 | Barton et al. | 717/137 |
| 2007/0088697 A1 | 4/2007 | Charlebois et al. | 707/6 |
| 2007/0089104 A1 | 4/2007 | Tal | 717/151 |

OTHER PUBLICATIONS

Fessant et al., "Optimizing Pattern Matching", Sep. 2001, ACM, pp. 26-37.*
Bravenboer et al., "Rewriting Strategies for Instruction Selection", 2002, Springer-Verlag Berlin Heidelberg, pp. 237-251.*
Expression Matching and Transformation Framework.

* cited by examiner

*Primary Examiner* — Ted T Vo
(74) *Attorney, Agent, or Firm* — Robert C. Rolnik; David A. Mims; Kermit Lopez

(57) ABSTRACT

A computer implemented method, system and computer program product for efficient multiple-pattern based matching and transformation of intermediate language expression trees in a compiler. Such an approach includes three constructs of pattern matchers namely a registry, a mapped registry and a registry instance for constructing multiple patterns and for enabling a matching and transformation process. These constructs narrow the number of relevant patterns applied against input expressions without repeatedly implementing an algorithm and also significantly reduce memory footprint and compilation time.

20 Claims, 7 Drawing Sheets

```
310——StoragePool localPool ;

UnifiableSymbol s ;
320——Matcher *P1 = mINC(mLOD(s), 1).copyToPool(localPool) ;
330——Matcher *P2 = mADD(mLDC(1), mLOD(s)).copyToPool(localPool) ;
340——Matcher *P = Matcher::mOr(*P1, *P2).copyToPool(localPool) ;
```

```
510─┐
    UnifiableOpCode cop(UnifiableOpCode::kCommutativeOp) ;

mOpList ol1, ol2 ;

Registry flatten = (    550              560              570
520─┐                        ╱                ╱                ╱
    Matcher(cop, Matcher(cop, ol1), Matcher(cop, ol2)) >> Matcher(cop, (ol1, ol2)),
530─┐
    Matcher(cop, Matcher(cop, ol1), _1) >> Matcher(cop, (ol1, _1)),
540─┐
    Matcher(cop, _1, Matcher(cop, ol1)) >> Matcher(cop, (_1, ol1))

) ;

flattenedExp = LoopTools::searchAndTransformPostPattern(proc, flatten, exp, pool) ;
```

FIG. 5

METHOD AND APPARATUS FOR EFFICIENT MULTIPLE-PATTERN BASED MATCHING AND TRANSFORMATION OF INTERMEDIATE LANGUAGE EXPRESSION TREES

TECHNICAL FIELD

Embodiments are generally related to data-processing systems and methods. Embodiments also relate in general to the field of computers and similar technologies, and in particular to software utilized in this field. In addition, embodiments relate to methods and systems for multiple-pattern-based matching and transformation of intermediate language expression trees in a compiler.

BACKGROUND OF THE INVENTION

A compiler is a mechanism that translates a source code program written in a high-level, human-readable programming language, into an equivalent intermediate representation for the program, that is, in a machine language that can be executed by a computer. An example of a compiler is an IBM XL compiler and an example of a generated intermediate representation is W-code, both of which are available by the IBM (International Business Machines) Corporation. The intermediate representation provides a stack-based representation of expressions in the program.

Note that the intermediate representation is often not provided in a form that can be executed by a machine. That is, the intermediate representation is more abstract than machine language. The intermediate representation is easier to process in compiler optimizations, because it is usually defined over some abstract machine (e.g., a "stack machine"), which is easier to manage and maintain the semantics, than optimizing an Abstract Syntax Trees representation (which is much closer to how the source program appears). The Intermediate Representation is also convenient for finally translating it into a machine language that can be executed by a computer.

A pattern is a reoccurring set of events or objects that repeat in a periodic fashion. Pattern matching is the act of checking for the presence of constituents of a given pattern. Pattern matching is used to test whether objects or applications have a desired structure. Pattern matching is also utilized to determine the relevant structure, and to retrieve the aligning parts, and also to substitute the matching part with something something else, Pattern matching an intermediate representation is a common technique for locating predictable statements and expressions and retrieving specific elements, in order to create derived expressions. This technique assists in identifying a loop that includes an induction variable, which adds a constant value to a variable per loop iteration. Therefore, pattern matching of intermediate representation is a useful technique in loop optimization.

Most existing pattern matching code, however, is hand crafted for specific patterns. While a generalized pattern matching code or pattern matcher for a given pattern may be written, it is cumbersome for the programmer. In addition, existing pattern matching code does not provide the capability of easily constructing complex pattern matchers and pattern transformers as objects using grammatical building blocks.

The Expression Matching and Transformation Framework (EMTF) can be utilized to easily define pattern matchers for inputs in the W-Code Intermediate Language. The advantages of EMTF are that the patterns defined in the framework can be easily embedded within the compiler code, and are similar to the abstract representation of W-Code expressions. Unification can also be utilized as a main tool for matching and retrieval. In the EMTF framework, operators can be defined to enhance patterns with logic.

For example, consider patterns p1 and p2. In such a situation, the expression formed by utilizing the 'or' operator as indicated by symbol "||" i.e., p1||p2 can match with the input expression tree if and only if p1 matches with the input expression tree, or p2 matches with the input expression tree. EMTF also enables creating patterns dynamically (e.g., creating patterns in a memory pool). This feature can be utilized to create, for example, an "|| . . . || . . . || . . . expression" (i.e., an 'or' expression of multiple patterns) dynamically without having to specify the entire combined pattern in advance.

FIG. 3 illustrates a prior art program execution sequence 300 for creating patterns utilizing expression matching and transformation programming framework (EMTF). As depicted in FIG. 1, a locally controlled memory pool 310 can be declared and and the content of the local pool 310 can be cleared from memory at the end of current scope. A first pattern 320 can be declared for adding 1 to a symbol s, and the first pattern 320 can be copied to the local pool 310. A second pattern 330 can be declared for adding 1 to the symbol s, and the second pattern 330 can also be copied to the local pool 310. A combined pattern 340 of first pattern 320 and second pattern 330 can also be created. The pattern elements that are already in the local pool 310 cannot be copied again, that is, each pattern element contains a single instance in a given memory pool. A large 'or' pattern of many patterns such as the first pattern 320 and the second pattern 330 can also be created in the program execution sequence 300 where the matching process sequentially tries one pattern after the other.

The problem associated with the program execution sequence 300 is that, if the resulting 'or' pattern includes hundreds of patterns, utilizing the resulting pattern can become very inefficient and it is also hard to manage the local memory pool 310. In addition, when the pattern is matched against an input by EMTF design, it stays matched (i.e. unifiable variables are bound to elements in the input until the pattern is unbound). Hence, if the pattern needs to be utilized multiple times before unbinding the pattern, such as, for example by multiple threads or in a recursive match transform sequence, multiple copies of the pattern need to be created. This results in an inefficiency of adding more copy process, which consequently increases compiler memory footprint.

Based on the foregoing it is believed that a need exists for an improved method, apparatus, and computer program product for efficient multiple-pattern based matching of intermediate representation and transformation of intermediate language expression trees, such that pattern matching allows nesting searches and transforms within one-another, and can be embedded within a source program.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as, a whole.

It is, therefore, one aspect of the present invention to provide for an improved data-processing method, system and computer-usable medium.

It is another aspect of the present invention to provide for a method, system and computer-usable medium for efficient multiple-pattern-based matching and transformation of intermediate language expression trees in a compiler.

The aforementioned aspects and other objectives and advantages can now be achieved as described herein. A computer implemented method, system and computer program product for efficient multiple-pattern based matching and transformation of intermediate language expression trees. Such an approach includes three constructs of pattern matchers namely a registry, mapped registry and a registry instance for constructing multiple patterns and for enabling efficient matching and transformation processes. These constructs can be utilized to narrow the number of relevant patterns applied against input expressions without repeatedly implementing an algorithm, while also reducing compilation time.

The patterns can be copied to the registry, which can be referenced by a list element. The patterns in the list element can be matched sequentially with an input until a match is found. The registry can be unified with the input expression and the matched patterns can be utilized for generating expression trees. If a match cannot be found the registry does not unify with input and a 'false' statement can be returned as a result of matching. Registry can be nested within a registry, and can be utilized as pattern elements in other patterns or registries The mapped registry can be derived from the registry, which provides the complete functionality of the registry, with the addition of mapping relevant patterns to 'keys'. An array of 'BitVector' can be created and can be defined for each 'keys' associated with pattern elements. The patterns can be added to mapped registry and bits in a 'Bit Vector' can be set to 'one' for relevant 'keys'. During a matching process, the mapped registry "looks" at the 'keys' at the root of the input expression tree, and then tries to match it using only the patterns having a bit(s) set to one in the 'BitVector' associated with the keys.

The registry instance can be initialized with reference to the registry and/or mapped registry and the relevant patterns can be copied to the registry instance during the matching process. The advantage of utilizing the registry instance is that the added memory footprint for concurrent matching using the registry can be significantly reduced, because the registry instance can be used instead of a registry and/or mapped registry.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 5 illustrates an exemplary program execution sequence utilizing Registry which includes transformation rules for efficient transformation of intermediate language expression trees, in accordance with a preferred embodiment;

DETAILED DESCRIPTION

The particular values and configurations discussed in these non-limiting examples can be varied and are cited merely to illustrate at least one embodiment and are not intended to limit the scope of such embodiments.

Figure 1:
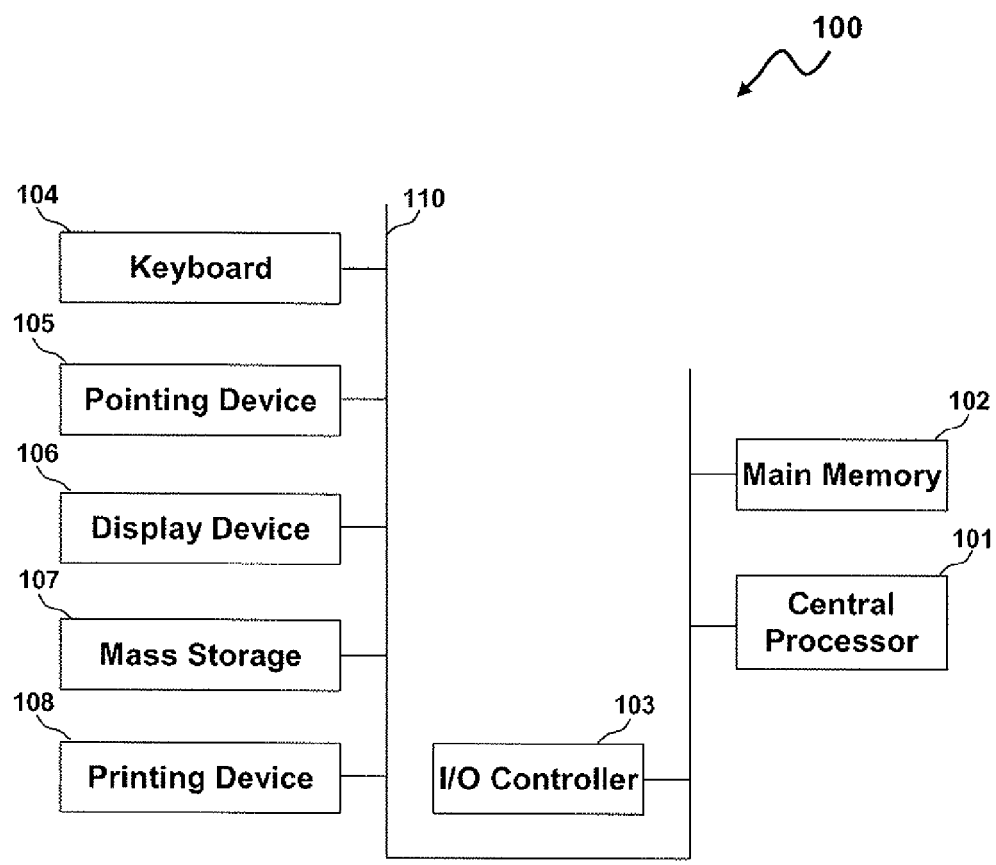
FIG. 1 illustrates a schematic view of a computer system in which the present invention may be embodied.

As depicted in FIG. 1, the present invention may be embodied in the context of a data-processing system 100 that includes a central processor 101, a main memory 102, an input/output controller 103, a keyboard 104, a pointing device 105 (e.g., mouse, track ball, pen device, or the like), a display device 106, and a mass storage device 107 (e.g., hard disk). Additional input/output devices, such as a printing device 108, may be included in the data-processing system 100 as desired. As illustrated, the various components of the data-processing system 100 communicate through a system bus 110 or similar architecture. In one particular embodiment, the data-processing system 100 can include, for example, an IBM-compatible personal computer, which is available from several vendors (including International Business Machine—IBM Corporation of Armonk, N.Y.).

Figure 2:
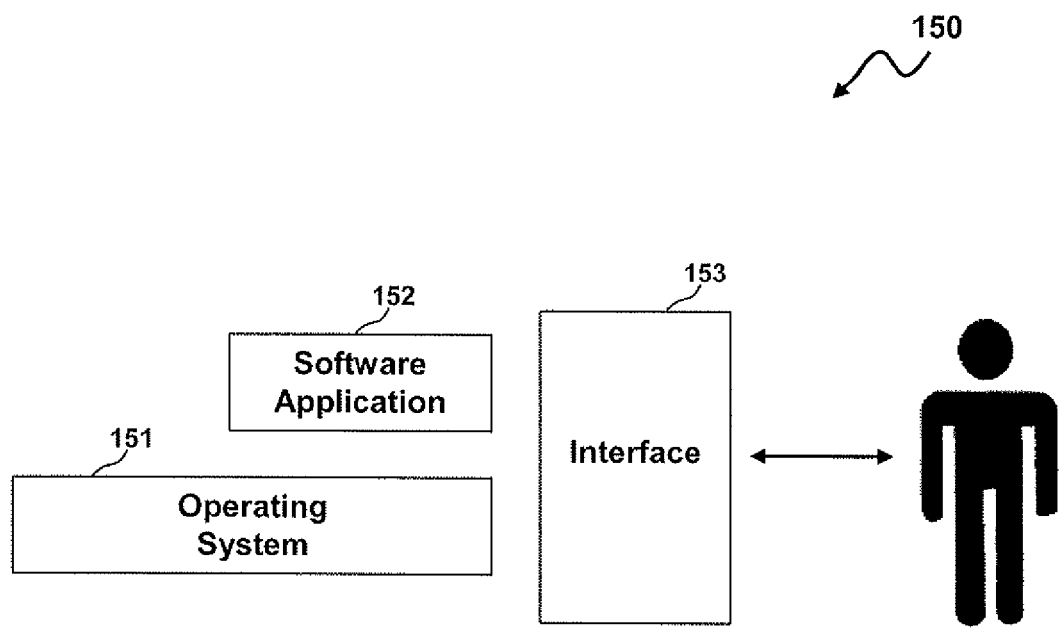
FIG. 2 illustrates a schematic view of a software system including an operating system, application software, and a user interface for carrying out the present invention.
Figure 3:
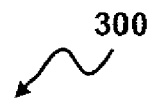
FIG. 3 illustrates a prior art program execution sequence for creating patterns using expression matching and transformation programming framework (EMTF)

FIG. 2 illustrates a computer software system 150 for directing the operation of the data-processing system 100. Software system 150, which is stored in system memory 102 and on disk memory 107, can include a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152. The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can includes instructions, such as the various operations described herein with respect to respective methods 400, 600 and 700 of FIG. 4, FIG. 6 and FIG. 7.

The following description is presented with respect to embodiments of the present invention, which can be embodied in the context of a data-processing system such as data-processing system 100 and computer software system 150 depicted in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
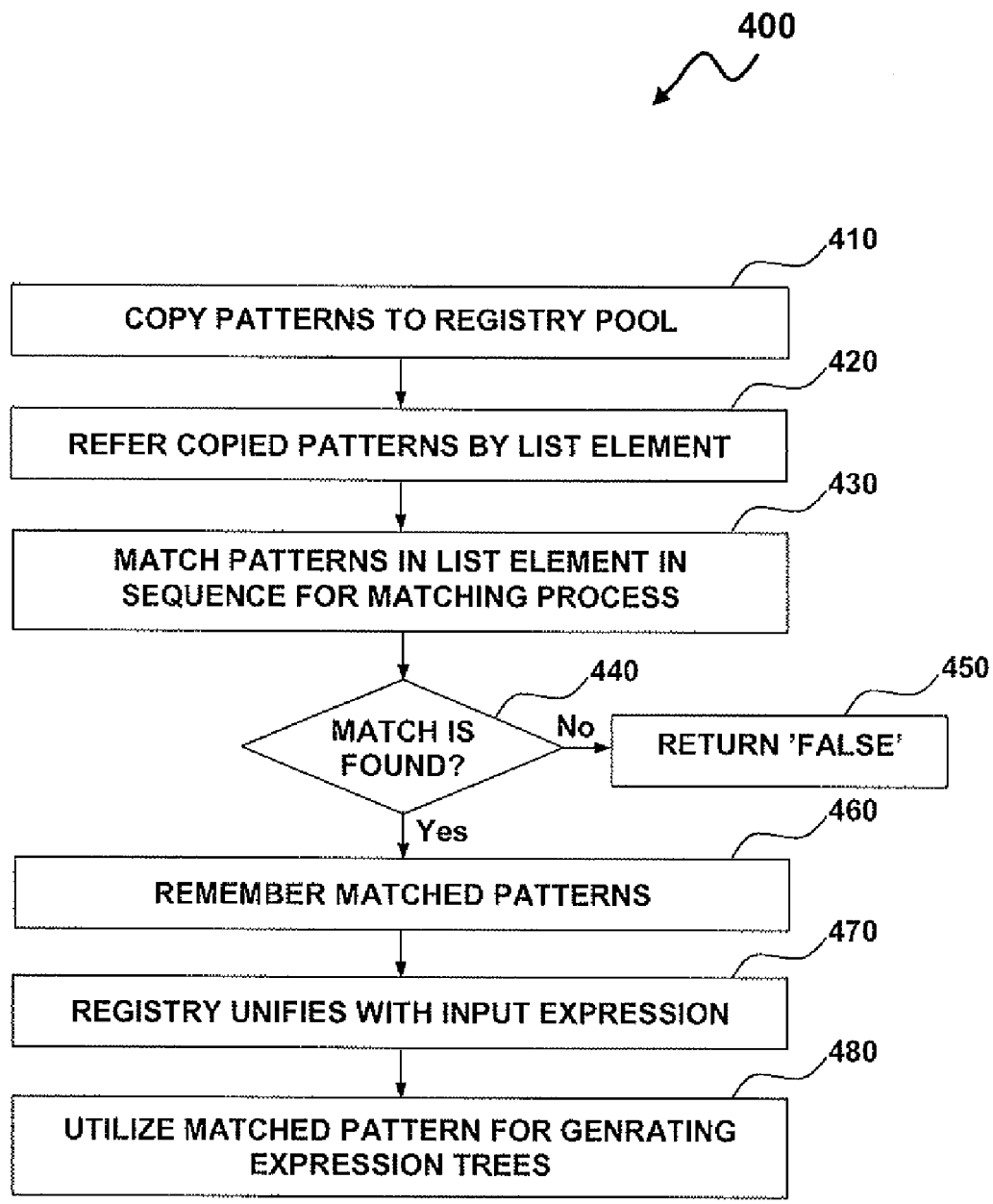
FIG. 4 illustrates a high-level logical flowchart of operations illustrating an exemplary method for constructing Registry for efficient multiple-pattern based matching and transformation of intermediate language expression trees, in accordance with a preferred embodiment.

Referring to FIG. 4 a high-level logical flowchart of operations illustrating an exemplary method 400 for constructing Registry for efficient multiple-pattern based matching and transformation of intermediate language expression trees is illustrated, in accordance with a preferred embodiment. Note that the method 400 depicted in FIG. 4 can be implemented in the context of a software module such as, for example, the application module 152 of computer software system 150 depicted in FIG. 2. A pattern is a reoccurring set of events or objects that repeat in a periodic fashion. The patterns can be copied to a Registry pool, as depicted at block 410.

The Registry can be utilized for creating a large 'or' pattern of multiple patterns. However, these patterns can be added to the Registry without considering pool management, pointers to patterns, etc. An 'or' of three patterns p1, p2, p3 can be created utilizing Registry r as follows.

Registry $r=(p1,p2,p3)$;

Similarly, the patterns p1, p2 and p3 can be added to the Registry r as follows.

$r+=p1$ $r+=p2$;

$r+=p3$;

A nested Registry with patterns p4 and p5 can also be added to the Registry r as follows.

$r+=(p4,p5)$;

For example, the comma operator between patterns p4 and p5 can be overloaded to produce a Registry. The '+=' operator between the Registry r and the pattern p1 can add a copy of the pattern p1 to the Registry r. The Registries can be nested within Registries, and can be utilized as pattern elements in other patterns or registries. The copied patterns such as pattern p1 and p2 can be referred by list element, as shown at block 420. The patterns in list element can be matched sequentially with an input for performing matching process, as illustrated at block 430. A determination can be made whether a match is found, as depicted at block 440. If a match is not found the Registry does not unify with the input and a 'false' statement can be returned as a result of matching, as shown at block 470. Otherwise, the matched patterns can be remembered, as depicted at block 450. Next, as depicted at block 460, the Registry can be unified with the input expression, as shown at block 470. The matched patterns can be utilized when generating expression trees for generating output, as illustrated at block 480.

Referring to FIG. 5, an exemplary program execution sequence 500 is illustrated, which utilizes a Registry and includes transformation rules for the efficient transformation of intermediate language expression trees, in accordance with a preferred embodiment. A Registry such as a Registry r can be utilized as any pattern element for efficient transformation of intermediate language expression trees. For example, program execution sequence 500 transforms intermediate language expression trees such as sequences of commutative binary operators to n-ary operators. That is, the expression tree (1) can be equivalently written as expression tree (2) assuming left-to-right association for '+' and '*' operators.

$x+y+z+w*q*r+s$ (1)

$(((x+y)+z)+((w*q)*r))+s$ (2)

The expression tree (2) can be written in intermediate language tree as follows:

ADD(ADD(ADD(ADD(x,y),z),MPY(MPY(w,q),r)),s)

The intermediate language tree can be transformed temporarily into 'flattened' tree for the purpose of re-association and balancing computations for super-scalar processors, where each commutative binary operator becomes an n-ary operator. Hence, the resulting flattened tree in intermediate language can be written as follows:

ADD(x,y,z,MPY(w,q,r),s)

The flattened tree in intermediate language can be easier to manipulate for example, sort according to loop invariance levels, re-associate, etc. The exemplary program execution sequence 500 utilizes Registry to perform the tree flattening operations as illustrated above. A bottom up post-transform can be performed, that is, a depth first pass is performed on the tree, when each node is exited the transformation can be attempted utilizing the given pattern. The pattern in that case can be a Registry containing transformation 'rules' that can flatten the tree. The order of the rules is important and is maintained appropriately by the Registry.

The first code 510 of the program execution sequence 500 restricts opcode unification only to opcode's that are commutative such as ADD, MPY etc. Temporary unifiable operand lists ol1 and ol2 can be declared, as shown in FIG. 5. A Registry 'flatten' can also be declared which includes flattening transformations such as rule 520, rule 530 and rule 540. Rule 520 can be utilized to transform expressions as follows:

ADD(ADD( . . . ),ADD( . . . )) to ADD( . . . )

MPY(MPY( . . . ),MPY( . . . ) to MPY( . . . )

This can be performed by unifying oil with the operand list of the first node 550, and ol2 with the operand list of the second node 560, and producing a new node 570 with the same commutative opcode and with an operand list that is a concatenation of ol1 and ol2 as shown in Rule 610. Rule 520 can be utilized to transform expressions as follows:

ADD(ADD( . . . ), x) to ADD( . . . , x)

MPY(MPY( . . . ), y) to MPY( . . . , y)

In cases where the Rule 510 cannot be applied a single element that appears as the second operand of a commutative operator can be concatenated to the operand list of the first operand that uses the same operator. Rule 530 is a symmetric rule for a single operand as the first operand of the commutative operator. The Registry is extremely convenient for constructing large 'or' patterns of multiple-patterns. However, the patterns can be added and maintained in sequence and the matching process simulates the behavior of the 'or' pattern.

Figure 6:
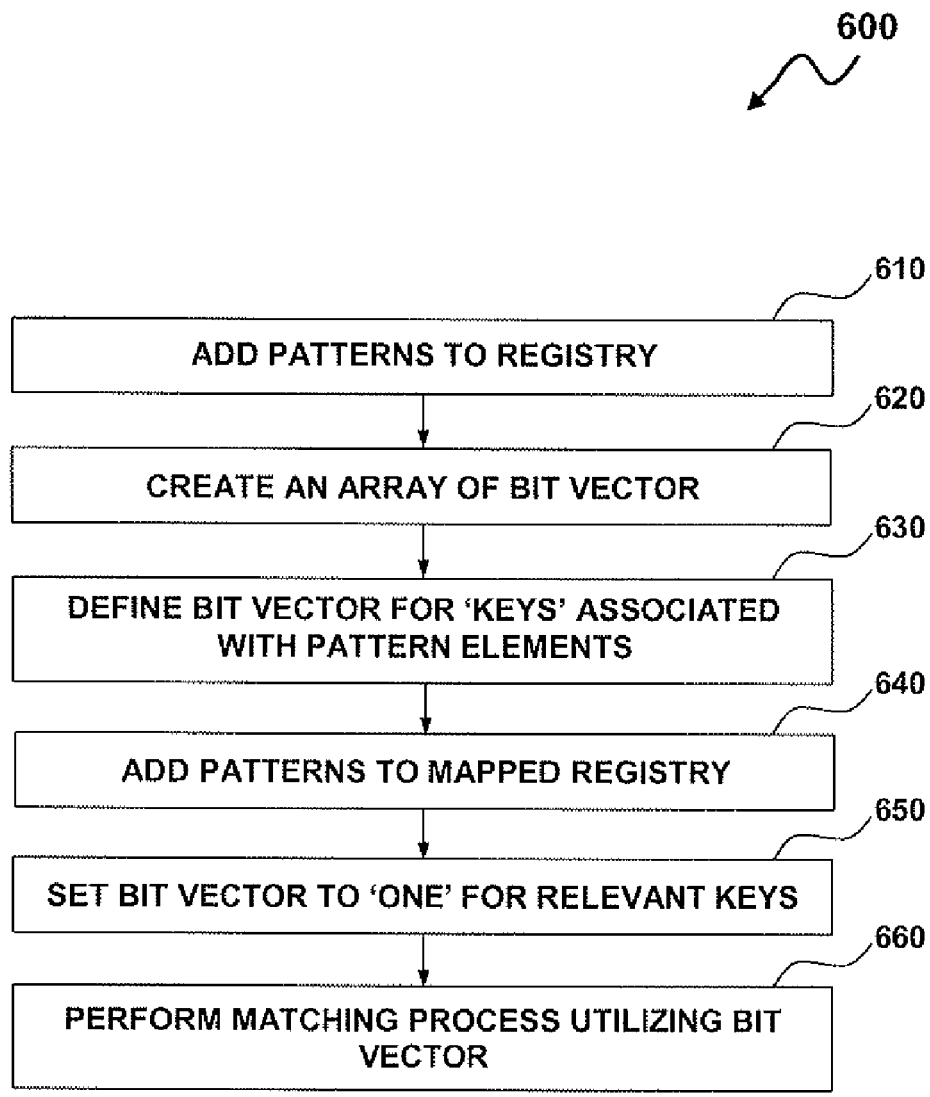
FIG. 6 illustrates a high-level logical flowchart of operations illustrating an exemplary method for constructing MappedRegistry for efficient multiple-pattern based matching and transformation of intermediate language expression trees, in accordance with a preferred embodiment.

Referring to FIG. 6 a high-level logical flowchart of operations illustrating an exemplary method 600 for constructing MappedRegistry for efficient multiple-pattern based matching and transformation of intermediate language expression trees is illustrated, in accordance with a preferred embodiment. As indicated at block 610, patterns can be added to the Registry. Next, as depicted at block 620, an array of 'Bit Vector' can be created. The MappedRegistry can be derived from the Registry, which provides the complete functionality of the Registry, with the addition of mapping relevant patterns to 'keys'. Each pattern element (e.g. mADD) can be associated with a set of relevant 'keys'. Thereafter, as illustrated at block 630, a 'Bit Vector' can be defined for each 'keys' associated with pattern elements. For example, the 'Bit Vector' can be an unlimited length vector of bits that can be either 'one' or 'zero'. Since the number of all possible 'keys' can be known in advance an array of such 'Bit Vector' can be created, where each array element can represent the map to relevant patterns for that element's key.

The patterns can be added to MappedRegistry, as described at block 640. The 'Bit Vector' can be set to 'one' for relevant keys, as shown at block 650. When a pattern such as pattern p1 and p2 is added to a MappedRegistry, it gets queried for its set of relevant 'keys' v, then for each key k in v, the bit n in the 'Bit Vector' k is set to one and for all the other Bit Vectors, the n bit remains set to 'zero'. Some patterns can report all 'keys' as relevant, for example, when the pattern utilize an Unifiable-OpCode that is not initialized to a value and can match any opcode, the appropriate bit can be set to 'one' in all the 'Bit Vector's. The matching process can be performed utilizing 'Bit Vector', as depicted at block 660. During the matching process, the MappedRegistry looks at the opcode or 'keys' at the root of the input expression tree, and then tries to match with patterns who's bit is set to one in the 'Bit Vector' associated with the keys.

The MappedRegistry can be signaled that no more patterns are going to be added to it in order to speed up the look-up of pattern references based on the map. Then, an array of pointers representing the 'Bit Vector' can be created based on the size of the number of patterns that are added and the array can be utilized to reference patterns based on their index. The method 600 can perform mapping at once in a more efficient way, and construct the array of pointers as described above and the MappedRegistry can be utilized to quickly match with the inputs.

For example, the opcode ADD associated with mADD can be utilized as a 'key' to use the pattern. If the operator of the root node of the input expression is not an ADD, then any pattern that possesses a root element that requires an opcode of ADD need not be matched. The EMTF matching elements can be extended to report the set of 'keys' that are relevant for matching and these 'keys' can be utilized to map the patterns in the MappedRegistry. The multiple 'keys' can be utilized to perform relevant matching because some EMTF elements may report multiple relevant opcode's for example mCommutativeOp, which reports keys such as ADD, MPY, MIN, MAX. If the MappedRegistry includes many patterns, this construct efficiently narrows down the number of relevant patterns to the minimum required based on the input, which significantly speeds up the matching process.

Figure 7:
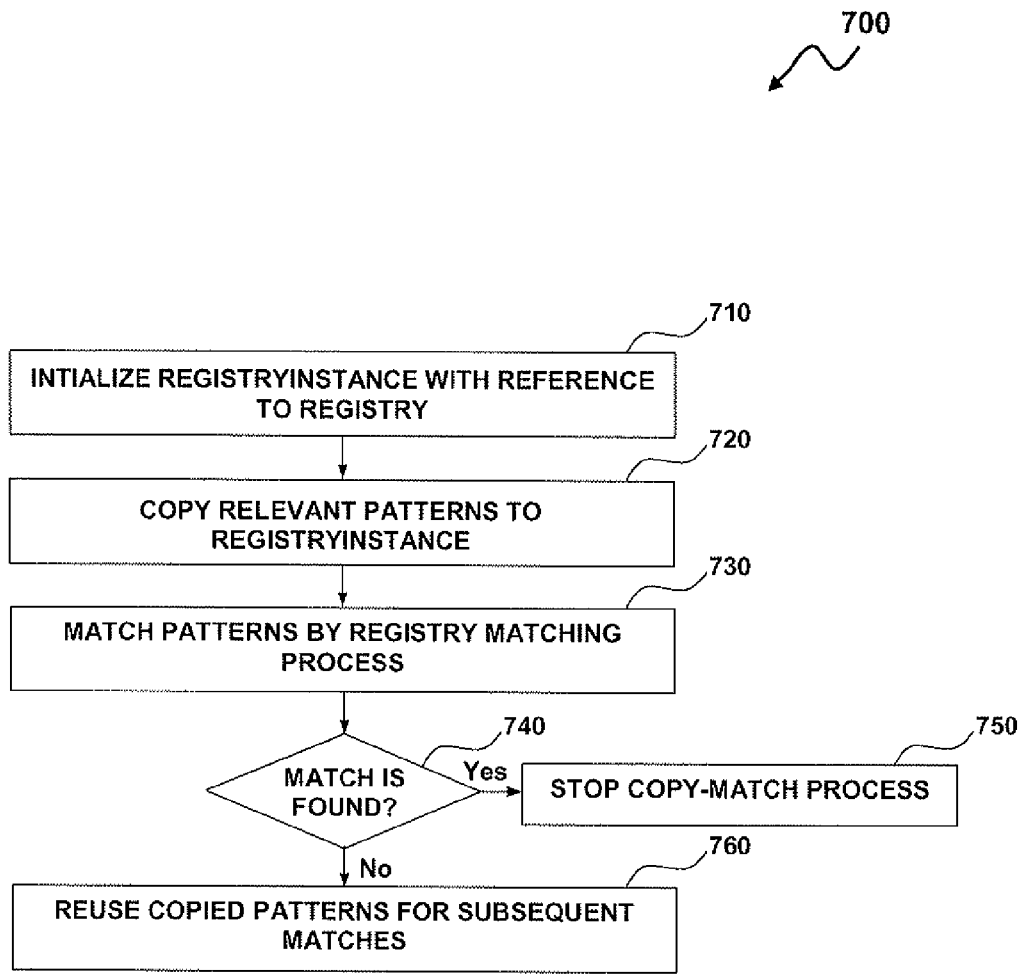
FIG. 7 illustrates a high-level logical flowchart of operations illustrating an exemplary method for constructing RegistryInstance for efficient multiple-pattern based matching and transformation of intermediate language expression trees, in accordance with a preferred embodiment.

Referring to FIG. 7 a high-level logical flowchart of operations illustrating an exemplary method 700 for constructing RegistryInstance for efficient multiple-pattern based matching and transformation of intermediate language expression trees is illustrated, in accordance with a preferred embodiment. Note that the method 700 depicted in FIG. 7 can be implemented in the context of a software module such as, for example, the application module 152 of computer software system 150 depicted in FIG. 2. The RegistryInstance can be initialized with reference to Registry and/or MappedRegistry, as depicted at block 710. Thereafter, relevant patterns can be copied to RegistryInstance in a 'lazy evaluation' method i.e. based on need, as shown at block 720. For matching multiple inputs, a RegistryInstance can eventually include a copy of all the patterns in its associated Registry and/or MappedRegistry. The RegistryInstance then maintains a state and its own pool where it copies relevant patterns into its pool prior to matching them, during a single match attempt. However, once patterns are copied into its pool, they cannot be copied again even if a new match is attempted utilizing the same patterns.

Next, as described at block 730, the patterns can be matched by Registry matching process. A determination can be made whether a match is found, as depicted at block 740. If a match is found the copy-match process can be stopped and the RegistryInstance can utilize no additional memory, as shown at block 750. Otherwise, the copied patterns can be reused for subsequent matches, as illustrated at block 760. Since no state is maintained or modified in the original Registry or MappedRegistry, it can be used as an immutable object, significantly simplifying multi-threaded code that needs to use the same Registry and/or MappedRegistry concurrently.

The advantage of using the RegistryInstance is that the added memory footprint for concurrent matching utilizing the Registry can be significantly reduced, since a separate RegistryInstance can be used instead of the Registry and/or MappedRegistry, without affecting the Registry, and without a need to copy the whole registry. The Registry can become 'read-only' as they are being 'read' by the RegistryInstance, but do not change their state, and thus can be safely accessed by multiple threads using separate RegistryInstance objects without any need for serializing or locking accesses. Additionally, using multiple RegistryInstance also reduces compile time, since initializing a full Registry of hundreds of patterns multiple times adds to compile-time.

It should be understood that at least some aspects of the present invention may alternatively be implemented in a computer-useable medium that contains a program product. For example, the processes depicted in FIGS. 4, 6 and 7 herein can be implemented in the context of such a program product. Programs defining functions on the present invention can be delivered to a data storage system or a computer system via media, which include, without limitation, non-writable storage media (e.g., CD-ROM), writable storage media (e.g., hard disk drive, read/write CD ROM, optical media), system memory such as but not limited to Random Access Memory (RAM). It should be understood, therefore, that such media, when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, the methods 400, 600 and 700 described herein, and in particular as shown and described in FIGS. 4, 6 and 7 can be deployed as process software in the context of a computer system or data-processing system as that depicted in FIG. 1-2.

While the present invention has been particularly shown and described with reference to a preferred embodiment, it will be understood by those skilled in the art that various changes in form and detail may be made therein without departing from the spirit and scope of the invention Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implementable method, comprising:
   a data-processing system creating a mapped registry from a registry associated with at least one pattern, said registry capable of managing and dynamically adding said at least one pattern to said registry;
   the data-processing system generating an array of bit vectors with respect to a plurality of keys associated with said at least one pattern thereby setting bits in said array of bit vectors to a value relevant to said plurality of keys associated with said at least one pattern, wherein generating further comprises storing the array of bit vectors to memory, wherein at least one pointer is associated to a key among the plurality of keys, and the at least one pointer is fewer in number than all the keys;
   the data-processing system performing a matching process by matching an input expression tree associated with said plurality of keys with said at least one pattern, wherein said at least one pattern contains a bit associated with said array of bit vectors, said bit set to said value, thereby significantly increasing a speed of said matching process and a compile time thereof; and
   the data-processing system performing a transformation process for a matched input in order to generate an output expression utilizing said mapped registry to thereby provide for an efficient multiple-pattern-based matching and transformation of intermediate language expression trees in a compiler.

2. The computer-implementable method of claim 1 further comprising,
   initializing a registry instance with reference to said mapped registry in order to create at least one copy of said at least one pattern associated with said registry; and
   utilizing said registry instance for said matching process to thereby significantly reduce an added memory footprint and said compile time thereof.

3. The computer-implementable method of claim 1 further comprising:
   creating an array of pointers representing a count of said at least one pattern in order to speed up said matching process.

4. The computer-implementable method of claim 1 wherein said registry comprises a plurality of nested registries.

5. The computer-implementable method of claim 1 wherein said registry is capable of constructing a plurality of alternative patterns of said at least one pattern.

6. The computer-implementable method of claim 1 wherein said transformation process comprises a plurality of transformation rules in order to perform tree-flattening operations.

7. The computer-implementable method of claim 1 wherein:
   said registry comprises a plurality of nested registries and said registry is capable of constructing a plurality of alternative patterns of said at least one pattern; and
   said transformation process comprises a plurality of transformation rules in order to perform tree-flattening operations.

8. A system, comprising:
   a processor;
   a data bus coupled to said processor; and
   a computer-usable medium embodying computer code, said computer-usable medium being coupled to said data bus, said computer program code comprising instructions executable by said processor and configured for:
   creating a mapped registry from a registry associated with at least one pattern, said registry capable of managing and dynamically adding said at least one pattern to said registry;
   generating an array of bit vectors with respect to a plurality of keys associated with said at least one pattern thereby setting bits in said array of bit vectors to a value relevant to said plurality of keys associated with said at least one pattern, wherein generating further comprises storing the array of bit vectors to memory, wherein at least one pointer is associated to a key among the plurality of keys, and the at least one pointer is fewer in number than all the plurality of keys;
   performing a matching process by matching an input expression tree associated with said plurality of keys with said at least one pattern, wherein said at least one pattern contains a bit associated with said array of bit vectors, said bit set to said value, thereby significantly increasing a speed of said matching process and a compile time thereof; and
   performing a transformation process for a matched input in order to generate an output expression utilizing said mapped registry to thereby provide for an efficient multiple-pattern-based matching and transformation of intermediate language expression trees in a compiler.

9. The system of claim 8, wherein said instructions are further configured for:
   initializing a registry instance with reference to said mapped registry in order to create at least one copy of said at least one pattern associated with said registry; and
   utilizing said registry instance for said matching process to thereby significantly reduce an added memory footprint and said compile time thereof.

10. The system of claim 8, wherein said instructions are further configured for:
    creating an array of pointers representing a count of said at least one pattern in order to speed up said matching process.

11. The system of claim 8, wherein said registry comprises a plurality of nested registries.

12. The system of claim 8, wherein said registry is capable of constructing a plurality of alternative patterns of said at least one pattern.

13. The system of claim 8 wherein said transformation process comprises a plurality of transformation rules in order to perform tree-flattening operations.

14. The system of claim 8 wherein:
    said registry comprises a plurality of nested registries and said registry is capable of constructing a plurality of alternative patterns of said at least one pattern; and
    said transformation process comprises a plurality of transformation rules in order to perform tree-flattening operations.

15. A computer-usable tangible storage device embodying computer program code, said computer program code comprising computer executable instructions configured for:
    creating a mapped registry from a registry associated with at least one pattern, said registry capable of managing and dynamically adding said at least one pattern to said registry;
    generating an array of bit vectors with respect to a plurality of keys associated with said at least one pattern thereby setting bits in said array of bit vectors to a value relevant to said plurality of keys associated with said at least one pattern, wherein generating further comprises storing the array of bit vectors to memory, wherein at least one pointer is associated to a key among the plurality of keys, and the at least one pointer is fewer in number than all the keys;

performing a matching process by matching an input expression tree associated with said plurality of keys with said at least one pattern, wherein said at least one pattern contains a bit associated with said array of bit vectors, said bit set to said value, thereby significantly increasing a speed of said matching process and a compile time thereof; and performing a transformation process for a matched input in order to generate an output expression utilizing said mapped registry to thereby provide for an efficient multiple-pattern-based matching and transformation of intermediate language expression trees in a compiler.

16. The computer-usable tangible storage device of claim 15, wherein said embodied computer program code further comprises computer executable instructions configured for:

initializing a registry instance with reference to said mapped registry in order to create at least one copy of said at least one pattern associated with said registry; and utilizing said registry instance for said matching process to thereby significantly reduce an added memory footprint and said compile time thereof.

17. The computer-usable tangible storage device of claim 15, wherein said embodied computer program code further comprises computer executable instructions configured for:

creating an array of pointers representing a count of said at least one pattern in order to speed up said matching process.

18. The computer-usable tangible storage device of claim 15, wherein said registry comprises a plurality of nested registries.

19. The computer-usable tangible storage device of claim 15, wherein said registry is capable of constructing a plurality of alternative patterns of said at least one pattern.

20. The computer-usable tangible storage device of claim 15, wherein said transformation process comprises a plurality of transformation rules in order to perform tree-flattening operations.

* * * * *